B. R. JOLLY.
COMBINED FIELD GLASS AND RANGE FINDER.
APPLICATION FILED JULY 30, 1917.
1,294,341.
Patented Feb. 11, 1919.
2 SHEETS—SHEET 1.
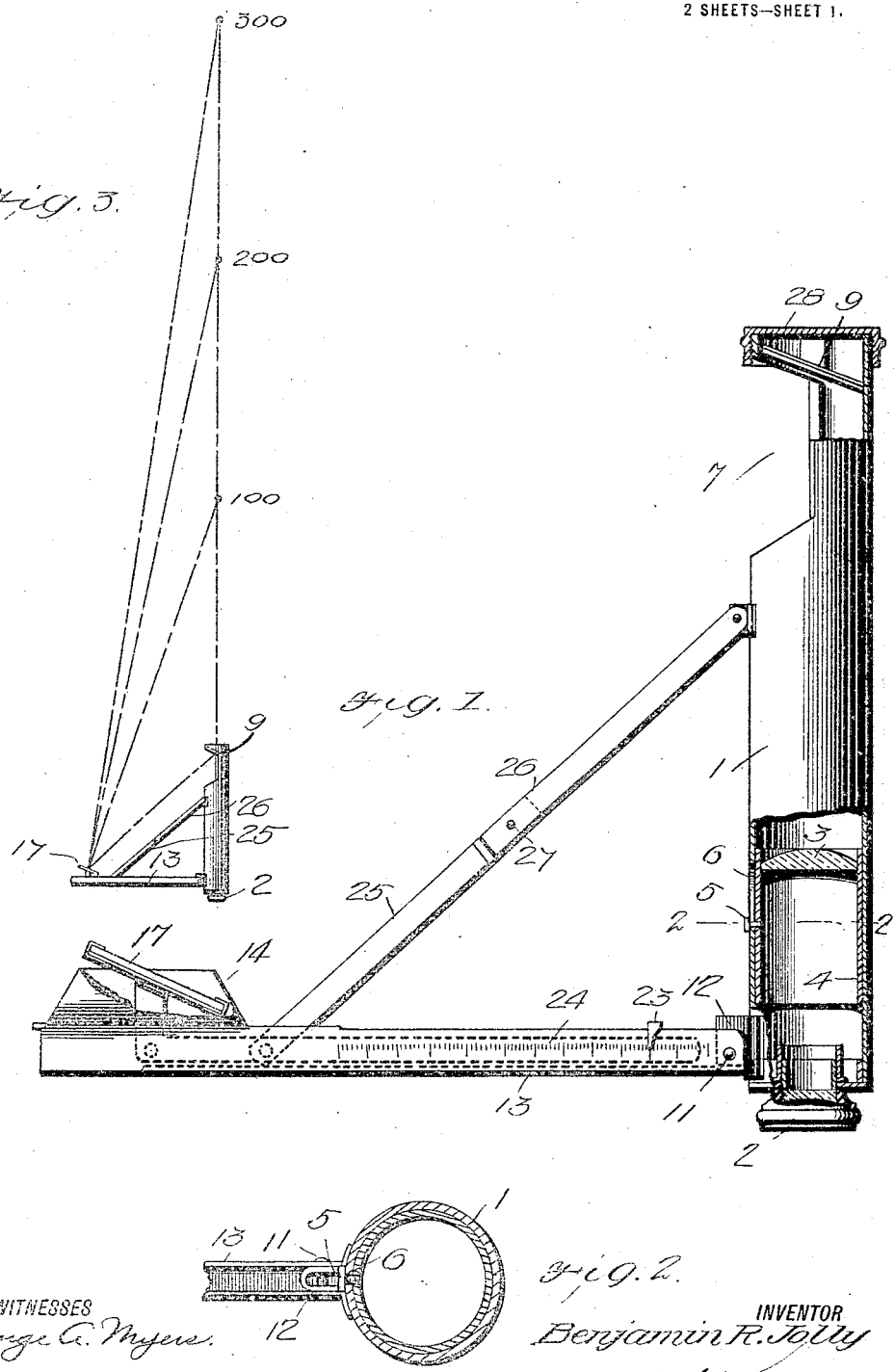
WITNESSES
George A. Myers.
INVENTOR
Benjamin R. Jolly
BY
Munn & Co
ATTORNEYS B. R. JOLLY.
COMBINED FIELD GLASS AND RANGE FINDER.
APPLICATION FILED JULY 30, 1917.
1,294,341.
Patented Feb. 11, 1919.
2 SHEETS—SHEET 2.
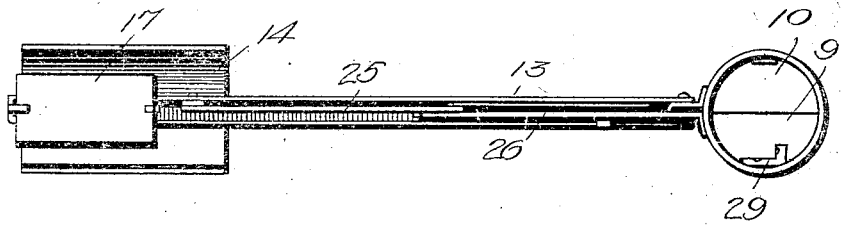
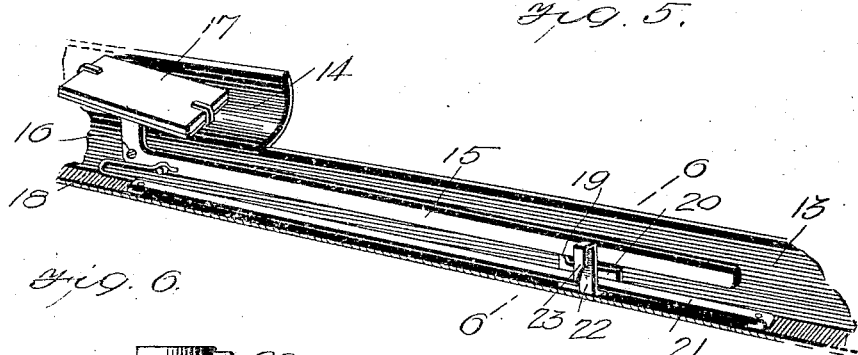
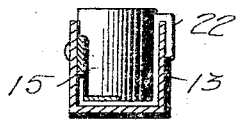
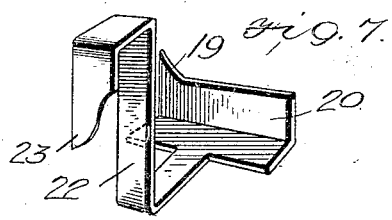
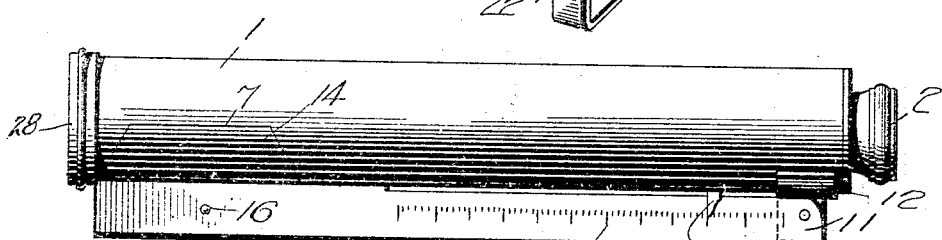
WITNESSES
George A. Myers
INVENTOR
Benjamin R. Jolly
BY
Munn & Co.
ATTORNEYS

UNITED STATES PATENT OFFICE.

BENJAMIN RUSH JOLLY, OF RALEIGH, NORTH CAROLINA.

COMBINED FIELD-GLASS AND RANGE-FINDER.

1,294,341.     Specification of Letters Patent.     Patented Feb. 11, 1919.

Application filed July 30, 1917. Serial No. 183,464.

*To all whom it may concern:*

Be it known that I, BENJAMIN R. JOLLY, a citizen of the United States, and a resident of Raleigh, in the county of Wake and State of North Carolina, have invented a new and useful Improvement in Combined Field-Glasses and Range-Finders, of which the following is a specification.

My invention relates to improvements in combined field glasses and range finders, and it consists in the combinations, constructions and arrangements herein described and claimed.

An object of my invention is to provide a combined field glass and range finder which can be used for one purpose or the other, or for both purposes, and which does not take up any more room, when in its folded condition, than an ordinary telescope.

A further object of my invention is to provide a combined field glass and range finder in which the range may be approximately determined by a single observer, with comparative ease and quickness.

A further object of my invention is to provide a combined field glass and range finder which may be folded so as to be stored away in the pocket.

A further object of my invention is to provide a device of the type described which consists of few parts and which, therefore, is not easily liable to get out of order.

Other objects of my invention will appear in the following specification, and the novel features of the invention will be particularly pointed out in the appended claims.

My invention is illustrated in the accompanying drawings forming part of this application, in which:

Figure 1 is a plan view of the device, certain parts being sections.

Fig. 2 is a sectional view along the line 2—2 of Fig. 1.

Fig. 3 is a diagrammatic view showing the method of using the range finder.

Fig. 4 is a view looking toward the front end of the instrument.

Fig. 5 is a perspective view of the pivoted mirror and means for operating the same.

Fig. 6 is a section along the line 6—6 of Fig. 5.

Fig. 7 is a perspective view showing a pointer and a cam member for operating the pivoted mirror.

Fig. 8 is a side view of the device showing the instrument in its closed condition.

Referring now particularly to Fig. 1, I have shown therein a field glass or telescope comprising a body portion 1, having an eye piece 2, and an objective lens 3, the arrangement being such that distant objects are magnified precisely as with an opera glass or field glasses. The objective lens 3, is disposed in a slidable tube 4, which may be moved by means of a screw 5, carried by the tube 4, and tends to project through a slot 6. This screw may be tightened so as to set the device at any focus desired.

Near the opposite end of the tube is a cut-away portion 7, and adjacent to this cut-away portion, is disposed a mirror 9. This mirror, as will be observed from Fig. 4, is semi-circular so as to leave a semi-circular space 10 on the upper half of the tube. The mirror 9 is disposed at such an angle as to reflect rays coming through the cut-away portion 7.

Pivotally secured at 11 to a bracket 12 carried by the tube 1, is an arm 13, which is U-shaped in cross section; see Fig. 6. This arm bears arc-shaped side members 14, at one end, which are of the same shape as the cut-away portion 7, so that when the arm 13 is folded in the manner shown in Fig. 8, the members 14 enter the cut-away portion 7 so as to complete the contour of the tube 1, thus bringing the arm 13 into close engagement with the tube.

Carried by the arm 13 is a bell-crank lever 15, which is pivoted at 16. The short arm of this bell-crank lever carries a mirror 17, this mirror 17 as well as the mirror 9 being plane. A spring 18 tends to normally force the long arm 15 inwardly. The arm may be shifted about the pivot 16 by means of a cam 19, which is carried on a slide 20; see Figs. 5 and 7. The slide 20 moves underneath a guide-strip 21. The slide 20 has an arm 22 which is bent into Z-shape form so as to pass over one edge of the arm 13, the end of the arm terminating in a pointer 23, which passes over a scale 24 at the outside of the arm.

A brace member is provided for holding the arm 13 at right angles to the axis of the tube 1, this brace member consisting of two links, 25 and 26, which are pivoted at 27, so that when the arm 13 is opened to its fullest extent, the brace members 25 and 26 form a rigid connection. This connection, however, may be flexed so as to permit the arm 13 to swing into close contact with the tube 1, as shown in Fig. 8.

From the foregoing description of the various parts of the device, the operation of the device may be readily understood. Let us assume that this device is to be used to determine the range of a distant flag-pole. The device is opened up by removing the cap 28 and swinging the arm 13 out into the position shown in Fig. 1. The operator now holds the eye-piece to his eye and views the distant object through the space 10 above the mirror 9. In order to see that the arm 13 is held in a horizontal position, the user of the device looks at the spirit level 29, in front of the mirror 9. Now looking at the mirror 9, he sees an image of the object but not in the same vertical line as the image viewed through the space 10. He now moves the slide 20 until the images viewed through the clear space 10, and as seen in the mirror 9, are in alinement in a vertical direction, so that the one image will be below the other, the mirrors being set so as to accomplish this result.

When the images are in alinement, then the distance is noted on the scale 24.

In Fig. 3, I have shown a diagrammatical illustration which explains the theory of the instrument. As the pointer 23 is moved, the cam 19 will raise or the spring 18 lower the arm 15 turning the mirror 17. If the object is at 300 yards, then the position of the mirror is such that the light will be reflected along the angle 300—17—9, and thence to the eye. If the object is at 200 yards, the light will be reflected at the angle 200—17—9, and then to the eye; so that the mirror 17 has to be turned a certain distance which distance is proportional to the movement of the pointer. It will be understood that when the word "proportional" is used, I do not mean in direct proportion. As a matter of fact, the scale 24 may be made by mathematical calculation, but the better way is to calibrate the scale by taking known distances and making observations directly with those known distances, thus eliminating any possibility of error in the use of mathematical formulæ alone.

The device may be folded up, and by placing on the cap, the arm 13 is held in the position shown in Fig. 8. It may then be carried in the pocket or stored away in small space.

This device is useful for ascertaining approximate ranges in war time, as for instance, the range of a battery, or of the periscope of a submarine, or the distance or altitude of an aeroplane. It may also be used for ascertaining speed of moving bodies, such as the speed of an automobile, a motor boat, or other similar vehicle. In ascertaining the speed, for instance of an automobile, the pointer 23 is set at a given distance, say, 88 yards. A stop-watch is started when the automobile passes the observer. He then follows the automobile with the range finder until the two images are in registration, when the watch is stopped. The record on the watch will give the time for traveling 88 yards.

The device may be used, as stated, for ascertaining vertical distances as well as horizontal. In this instance, the arm 13 is brought to a vertical position and the operator then looks at the short arm of the L-shaped spirit level to determine whether or not the arm 13 is vertical. The use of the instrument is the same as that in determining horizontal distances; in this instance, however, the images are brought into horizontal alinement instead of vertical alinement, and then the distance on the scale is read off.

Obviously, the scale may be calibrated in any suitable measure, such as yards, feet, meters. etc.

I claim:

1. A combined field glass and range finder comprising a main tube having an eye piece and an objective lens, said main tube having a portion cut away in the side thereof, a stationary mirror disposed near said cut away portion, the plane of the mirror being at an acute angle to the longitudinal axis of the tube for reflecting light coming through said cut away portion, said mirror being of semi-circular shape to provide a space between the mirror and the opposite wall of the tube, a plane mirror pivotally mounted on a support connected with said tube, and means for moving said plane mirror to different angular positions with respect to the axis of the tube.

2. A combined field glass and range finder comprising a main tube having an eye piece and an objective lens, said main tube having a portion cut away in the side thereof, a mirror disposed near said cut away portion for reflecting light coming through said cut away portion, said mirror being of semi-circular shape to provide a space between the mirror and the opposite wall of the tube, an arm pivotally connected with said main tube, means for holding said arm rigidly at right angles with the tube, a plane mirror pivotally mounted on said arm, and means for moving said mirror to different angular positions with respect to the axis of the tube.

3. A combined field glass and range finder comprising a main tube having an eye piece and an objective lens, said main tube having a portion cut away in the side thereof, a mirror disposed near said cut away portion for reflecting light coming through said cut away portion, said mirror being of semi-circular shape to provide a space between the mirror and the opposite wall of the tube, an arm pivotally connected with said main tube, means for holding said arm rigidly at right angles with the tube, a plane mirror pivotally mounted on said arm, a scale carried by said arm, a pointer movable along said scale, and means operated by the movement of the pointer along the scale for rotating said plane mirror on its pivot.

4. A combined field glass and range finder comprising a main tube having an eye piece and an objective lens, said main tube having a portion cut away in the side thereof, a plane mirror disposed near said cut away portion for reflecting light coming through said cut away portion, said mirror filling one half of the cross sectional area of the tube, a space being left between the wall of the mirror and the opposite wall of the tube, an arm pivotally connected with said main tube, a jointed brace member for rigidly holding the arm at right angles with the tube, a bell crank lever carried by the arm, a plane mirror carried by one arm of said bell crank lever, a cam member for moving said bell crank lever, a scale carried by said arm, and a pointer connected with the cam and arranged to pass over the scale.

5. A combined field glass and range finder comprising a main tube having an eye piece and an objective lens, said main tube having a portion cut away in the side thereof, a plane mirror disposed near said cut away portion for reflecting light coming through said cut away portion, said mirror filling one half of the cross sectional area of the tube, a space being left between the wall of the mirror and the opposite wall of the tube, an arm pivotally connected with said main tube, a jointed brace member for rigidly holding the arm at right angles with the tube, a bell crank lever carried by the arm, a plane mirror carried by one arm of said bell crank lever, a slidable cam carried by said arm and arranged to engage the bell crank lever to move the latter, a spring carried by the arm for exerting tension on the bell crank lever, a pointer connected with said cam, and a scale on said arm arranged to be traversed by the pointer.

6. A combined field glass and range finder comprising a main tube having an eye piece and an objective lens, said main tube having a portion cut away from the side thereof, a plane mirror disposed near said cut away portion for reflecting light coming through said cut away portion, said mirror filling one half of the cross sectional area of the tube, a space being left between the wall of the mirror and the opposite wall of the tube, an arm pivotally connected with said main tube, a jointed brace member for rigidly holding the arm at right angles with the tube, a bell crank lever carried by the arm, a plane mirror carried by one arm of said bell crank lever, a slidable member carried by said arm, said slidable member having a cam arranged to engage the bell crank lever for moving the same and being bent over the side of the arm and terminating in a pointer, a scale carried by the arm and arranged to be traversed by the pointer, a spring for placing the bell crank lever under tension, and a locking cap arranged to engage a portion of the pivoted arm to retain the latter in its folded position.

7. A combined field glass and range finder comprising a main tube having an eye piece and an objective lens, said main tube having a portion cut away in the side thereof, a stationary mirror disposed near said cut away portion, the plane of the mirror being at an active angle to the longitudinal axis of the tube for reflecting light coming through said cut away portion, said mirror being of semi-circular shape to provide a space between the mirror and the opposite wall of the tube, a plane mirror pivotally mounted on a support connected with said tube, means for moving said plane mirror to different angular positions with respect to the axis of the tube, and means connected with said mirror moving means for indicating the position of the plane mirror.

8. A combined field glass and range finder comprising a main tube having an eye piece and an objective lens, said main tube having a portion cut away in the side thereof, a stationary mirror disposed near said cut away portion for reflecting light coming through said cut away portion, said mirror being of semi-circular shape to provide a space between the mirror and the opposite wall of the tube, an arm pivotally connected with said main tube, a second mirror, pivotally mounted on said arm and arranged to reflect light to said first mirror, and means for moving said second-named mirror to different angular positions with respect to the axis of the tube.

9. A combined field glass and range finder comprising a main tube having an eye piece and an objective lens, said main tube having a portion cut away in the side thereof, a mirror disposed near said cut away portion for reflecting light coming through said cut away portion, said mirror being of semi-circular shape to provide a space between the mirror and the opposite wall of the tube, an arm pivotally connected with said main tube, a second mirror pivotally mounted on said arm and arranged to reflect light to said first mirror, means for moving said second-named mirror to different angular positions with respect to the axis of the tube, said pivoted arm being foldable on its pivot to bring said second-named mirror within the main tube through the cut away portion thereof.

10. A device of the class described, comprising a viewing tube having a viewing opening at one end, a stationary plane mirror of semi-circular shape disposed within the tube near the opposite end, the plane of the mirror being at an acute angle to the longitudinal axis of the tube, said mirror being spaced from a portion of the wall of the tube to provide a direct view opening, said tube having an opening in the side thereof facing the reflecting surface of the mirror, an arm pivotally connected to the tube near the forward end thereof, a tube wall portion secured to said arm and adapted to close the opening in the side of the tube, and a mirror secured to said wall portion for reflecting the image of an object onto the first named mirror.

11. A device of the class described, comprising a viewing tube having a viewing opening at one end, a stationary plane mirror disposed within the tube near the opposite end, the plane of the mirror being at an acute angle to the longitudinal axis of the tube, said mirror being spaced from a portion of the wall of the tube to provide a direct view opening, said tube having an opening in the side thereof facing the reflecting surface of the mirror, an arm pivotally connected to the tube near the forward end thereof, a tube wall portion secured to said arm and adapted to close the opening in the side of the tube, and a mirror secured to said wall portion for reflecting the image of an object onto the first named mirror.

12. A device of the class described, comprising a viewing tube having a viewing opening at one end, a stationary plane mirror disposed within the tube near the opposite end, the plane of the mirror being at an acute angle to the longitudinal axis of the tube, said mirror being spaced from a portion of the wall of the tube to provide a direct view opening, said tube having an opening in the side thereof facing the reflecting surface of the mirror, an arm pivotally connected to the tube near the forward end thereof, a tube wall portion secured to said arm and adapted to close the opening in the side of the tube, a mirror secured to said wall portion for reflecting the image of an object onto the first named mirror, and a jointed brace member for rigidly holding the pivoted arm at right angles with the tube.

BENJAMIN RUSH JOLLY.

Copies of this patent may be obtained for five cents each, by addressing the "Commissioner of Patents, Washington, D. C."